J. SLAUDER.
Grain Drill.
No. 67,141.
Patented July 23, 1867.
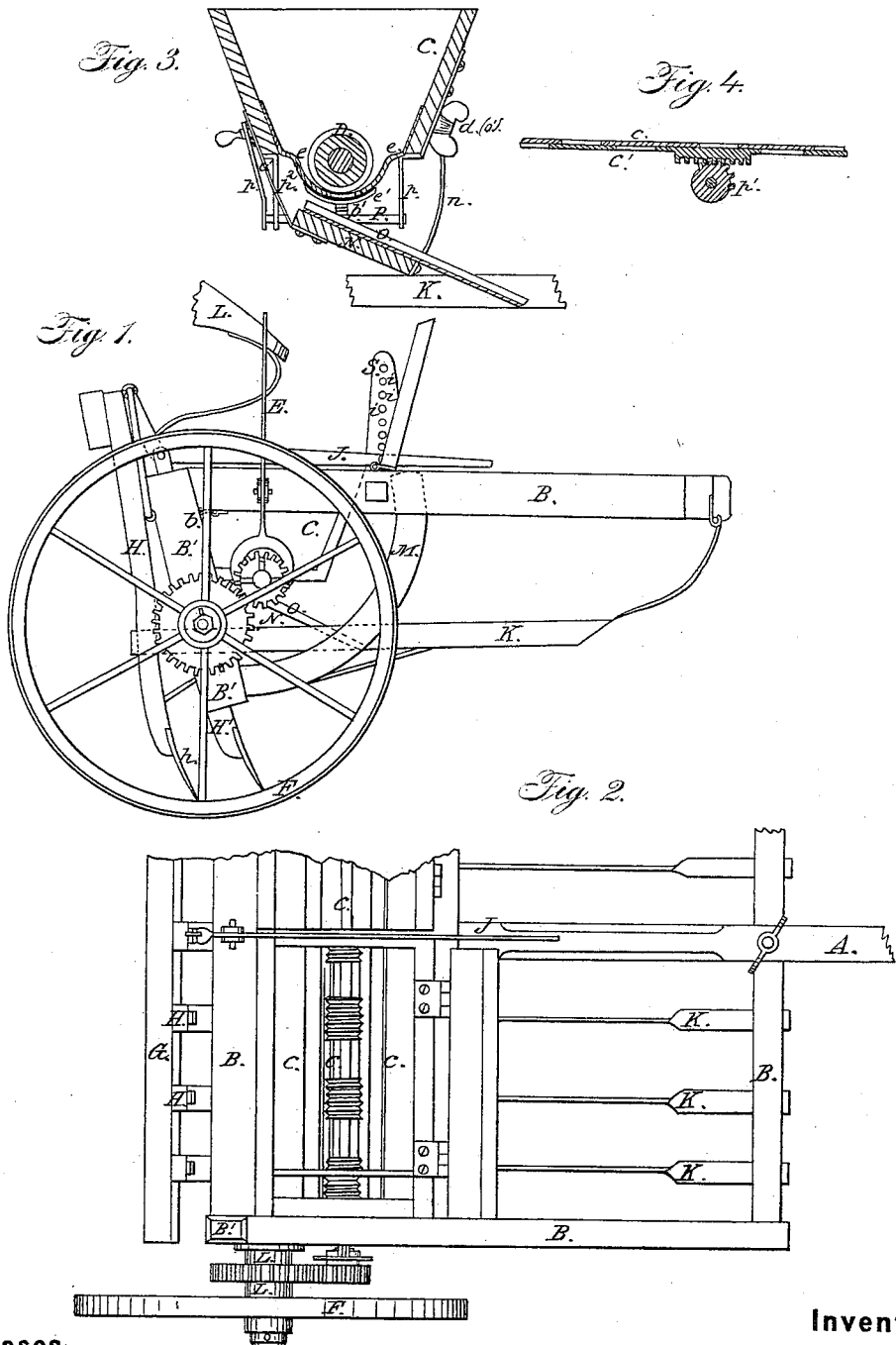

United States Patent Office.

JACOB SLAUDER, OF OSBORN, OHIO, ASSIGNOR TO HIMSELF AND LEVI C. SMITH, OF THE SAME PLACE.

Letters Patent No. 67,141, dated July 23, 1867.

---

IMPROVEMENT IN BROADCAST SEEDERS.

---

The Schedule referred to in these Letters Patent and making part of the same.

---

TO ALL WHOM IT MAY CONCERN:

Be it known that I, JACOB SLAUDER, of Osborn, in the county of Green, and State of Ohio, have invented a new and useful Broadcast Seeder; and I do hereby declare the following to be a full, clear, and exact description of the same, reference being had to the accompanying drawings, forming part of this specification, and in which—

Figure 1 is a side elevation of my invention.
Figure 2 is a horizontal section of the same.
Figure 3 is a cross-section of the seed-box.
Figure 4 shows the mode of regulating the size of the holes through which the seed passes from the seed-box.
Similar letters of reference indicate corresponding parts in the several figures.

In this invention the seed-board is made reversible, so as to throw the seed in front of or behind the plough, at pleasure. Secondly, the ploughs can be removed and drill-teeth substituted, hose being attached for the purpose of conveying the seed from the seed-board to the conducting-tubes. Thirdly, the seed-box can readily be adjusted to sow oats, as well as wheat and other grains.

In the drawings, A represents the draw-beam, B B parts of the frame, C the seed-box, D the agitator, E the adjusting-lever of the agitator, F F the drive-wheels, and G a movable beam extending across the machine, to which the plough-standards H H are attached. The beam G is hung on the end of a lever, I, pivoted on the frame B, and regulated by the pins $i\ i\ i$ in the post I'. For the purpose of better pulverizing the ground, I attach only the alternate plough-standards H H directly to the beam G, and hang the others H' H' a little in advance of the standards H H upon the plough-beams K K. The plough-beams K K are at their front extremity fixed to the forward part of the frame B, and at their rear extremity enter slots in the upright plough-standards H H, in which they are fastened by pins, or otherwise. Of course, as there are only plough-standards H H corresponding to alternate plough-beams K K, a set of alternate half standards, not bearing ploughs, are provided, hanging from the beam G sufficiently far to receive the ends of the alternate plough-beams, so that, of the standards attached to the beam G, every other one descends to the ground, bearing a plough, $h$, and every other one descends only to about a foot from the ground, to receive and support the rear ends of alternate plough-beams, the latter plough-beams bearing short plough-standards H' H', attached to the plough-beams in the same way that the standards H H are attached to them. The wheels F F work on short shafts L L, which bear in boxes in the lower part of the upright posts B' B', there being no axle-tree extending across the machine. C' is the open cover of the seed-box. Z is the driver's seat. The seed-box C is so attached to the machine that it can be removed when necessary. It is not necessary for me to show here in what manner this may be effected, as any mechanic can accomplish the result by a variety of devices in common use. Neither do I intend to describe minutely the apparatus D for distributing the seed, it being the shaft with the worm segments already used in machines patented by me previously to this application. But, in the following particulars, the seed-box and the method of attaching and adjusting the seed-board are new. The agitator D works on bearings outside of the seed-box, and is therefore entirely independent of the bottom $c\ c'$ of the latter. This bottom $c\ c'$ is movable, and can be raised or depressed by the set-screws $c''$ in the side of the box C. When oats are to be sown, a large space must be left below the agitator D, and between it and the outlet-holes in the bottom $c\ c'$, for the grain to pass through. This result is readily obtained by lowering the bottom $c\ c'$, as just explained. The sower may in this manner be adjusted for sowing any grain, however coarse or fine. The holes through which the seed escape are regulated by the common device of a sliding false bottom, $c'$, under the bottom $c$, the sliding bottom worked back and forth under the seed-box by means of the pinion $p'$ on the shaft P, operated by the handle or crank $p''$. $p\ p$ are merely the bearings of the shaft P, showing how the latter is attached to the seed-box. The seed, escaping through the bottom of the seed-box, falls upon the seed-board N. O O are conducting-channels fixed upon the upper surface of the seed-board, and may be used or not, accordingly as it is desired to sow the seed in drills or broadcast. The seed-board N is fastened to the box C by a strip of metal, $n'$, at its rear or upper side, and the long strip $n$ at its forward or lower side. These strips can be reversed, and $n'$ attached to the forward side of the box C while $n$ is attached to the rear side. By this means the seed-board may be reversed, and made to throw the seed either before the ploughs or behind them, accordingly as it is desired to plough it in or not.

In a seeder thus constructed, the seed-box can be removed, and the beam G with its attached standards taken off, and the ploughs or cultivating-teeth attached to the rear end of the plough-beams K K, thus forming the common cultivator. Not only can this be done, but, leaving the seed-box in its place, drill-teeth, with conducting-tubes, can be attached to the rear ends of the plough-beams K K, and hose may lead from the seed-channels O to the conducting-tubes, and the seed thus sown in drills. When this is the case, the seed-board N must be reversed, so as to sow the seed in the rear of the box C.

Having thus described my invention, what I claim as new, and desire to secure by Letters Patent, is—

1. The reversible seed-board N attached to the seed-box, as above shown, when constructed and used substantially as and for the purpose described.

2. The adjustable bottom $c\,c'$ of the seed-box, which may be elevated or depressed at pleasure, substantially as and for the purpose specified.

3. The combination of the plough-beams K K, the plough-standards H H, the beam G, and the lever I, substantially as and for the purpose described.

4. The arrangement of the alternate short standards H' on the plough-beams K, and the long standards H affixed to the beam G, substantially as and for the purpose specified.

To the above specification of my improvement I have signed my hand this 14th day of May, 1867.

JACOB SLAUDER.

Witnesses:
N. K. ELLSWORTH,
CHARLES A. PETTIT.